United States Patent [19]
Spitzer

[11] Patent Number: 6,077,486
[45] Date of Patent: Jun. 20, 2000

[54] PROCESS FOR PURIFYING ALUMINA BY MIXING A BAYER PROCESS STREAM CONTAINING SODIUM ALUMINATE WITH AMIDOXIME POLYMER TO REDUCE THE LEVEL OF IRON

[75] Inventor: Donald P. Spitzer, Riverside, Conn.

[73] Assignee: Cytec Technology Corp., Wilmington, Del.

[21] Appl. No.: 09/276,357

[22] Filed: Mar. 25, 1999

[51] Int. Cl.[7] .............................. C01F 7/06; C01G 49/00; B01D 21/01
[52] U.S. Cl. ........................... 423/121; 423/122; 210/735
[58] Field of Search .................................... 423/121, 122, 423/140, 600, 625; 210/735; 209/5

[56] References Cited

U.S. PATENT DOCUMENTS

| | | | |
|---|---|---|---|
| 3,088,798 | 5/1963 | Fetscher | 23/14.5 |
| 3,088,799 | 5/1963 | Fetscher | 23/14.5 |
| 3,607,140 | 9/1971 | Miller et al. | 423/121 |
| 3,728,432 | 4/1973 | Petitjean et al. | 423/121 |
| 3,729,542 | 4/1973 | Goheen | 423/121 |
| 3,796,789 | 3/1974 | Adams | 423/122 |
| 4,713,222 | 12/1987 | Owen et al. | 423/122 |
| 4,717,550 | 1/1988 | Spitzer et al. | 423/121 |
| 4,767,540 | 8/1988 | Spitzer et al. | 210/728 |

FOREIGN PATENT DOCUMENTS

WO 91/18026  11/1991  WIPO .

OTHER PUBLICATIONS

A.S. Rthenberg, D.P. Spitzer, M.E. Lewellyn and H.I. Heitner, "New Reagents for Alumina Processing" Light Metals 1989 Edited by Paul G. Campbell, The Minerals, Metals & Materials Society, 1988, pp. 91–96, no month.

P. Basu, G.A. Nitowski and P.J. The, "Chemical Interactions of Iron Minerals During Bayer Digest and Clarification", Eds. J.E. Dutrizc and A.J. Monhemius, Ellis Horwood Limited, "Iron Control in Hydrometallurgy", 1986, pp. 223–244, no month.

Michael B. Colella, Sidney Siggia and Ramon M. Barnes, "Poly(acrylamidoxime) Resin for Determination of Trace Metals in Natural Waters", Anal. Chem. 1980, 52 pages 2347–2350, no month.

Hiroski Egawa, Nalan Kabay, Akinori Jyo, Masaki Hirono and Taketomi Shuto, "Recovery of Uranium from Seawater. 15. Development of Amidoxime Resins with High Sedimentation Velocity for Passively Driver Fluidized Bed Adsorbers", Ind. Eng. Chem. Res, 33, 1994, pp. 657–661, no month.

U. Schilde, H. Kraudelt, and E. Uhlemann and U. Gohlke, "Selectivity of Amidozime Polymers for the Sorption of Gallate", Separation Science and Technology, 30 (10), 1995, pp. 2245–2250, no month.

F. Vernon and T.W. Kyffin, "Chelating Ion–Exchangers Containing N–Substituted Hydroxylamine Functional Groups", Analytica Chimica Acta, 94 (1977), pp. 317–322, no month.

F.L.M. Schouteden, "Polyacrylamidoximes", Makromol Chem (1957) 24 pp. 25–49, no month.

M. B. Colella, S. Siggia and R. M. Barnes, "Synthesis and Characterization of a Poly(acrylamidoxime) Metal Chelating Resin", Anal. Chem. (1980) 52, pp. 967–972, no month.

P. A. Riveros, "Recovery of Gallium from Bayer Liquors with an Amidoxime Resin", Hydrometallurgy, 25 (1990), pp. 1–18, no month.

*Primary Examiner*—Steven Bos
*Attorney, Agent, or Firm*—Joseph J. Mallon

[57] ABSTRACT

A process for reducing the level of colloidal iron in a Bayer process stream comprises intermixing an amidoxime polymer with a Bayer process stream and separating the resultant polymer-iron complex to provide purified sodium aluminate solution.

18 Claims, No Drawings

PROCESS FOR PURIFYING ALUMINA BY MIXING A BAYER PROCESS STREAM CONTAINING SODIUM ALUMINATE WITH AMIDOXIME POLYMER TO REDUCE THE LEVEL OF IRON

The present invention involves a process of alumina manufacture via the Bayer process. More particularly, it is concerned with improvements in the Bayer alumina process by the removal of colloidal iron and/or other impurities from Bayer process streams by contacting the streams with an amidoxime polymer.

BACKGROUND OF THE INVENTION

The almost universally used process for the manufacture of alumina is the Bayer process. In a typical commercial Bayer process, the Bayer process stream begins with the pulverization of raw bauxite to a finely divided state. The pulverized ore is then fed to a slurry mixer where a 50% solids slurry is prepared using spent liquor. This bauxite slurry is then diluted with a highly alkaline sodium hydroxide solution and then sent through a series of digesters at temperatures of about 1400–300° C. and under pressures of about 50–1500 p.s.i. Under these conditions, typically 98% of the total available alumina is extracted from the ore which may contain both trihydrate and monohydrate forms of alumina. In the next stage, the Bayer process stream that exits from the digesters passes through a series of flash tanks where heat and condensate are recovered as the digested slurry is cooled to about 110° C. and brought to atmospheric pressure. This digested slurry typically contains a solution of sodium aluminate and about 3–8% of insoluble particles ("red mud").

After removal of the coarse solid particles ("sand"), the slurry of sodium aluminate and insoluble particles is fed to the center well of a mud settler. As the insoluble particles settle, partially clarified sodium aluminate solution, referred to as "green" or "pregnant" liquor, overflows a weir at the top of the mud settling tank and this Bayer process stream is then passed to filtration. Filtration is generally necessary because the mud settler only partially separates the red mud from the sodium aluminate solution. The filtered sodium aluminate solution is then passed to the precipitation stage, where it is cooled to precipitate the trihydrate. The settled solids are withdrawn from the bottom of the mud settler and passed through a countercurrent washing circuit for recovery of sodium aluminate and caustic.

The red muds include various components of the Bayer process stream that are insoluble under highly alkaline conditions, including insoluble or colloidal iron. It is important to rapidly and cleanly separate the red mud from the sodium aluminate solution in order to make this particular step economically efficient. If the rate of separation is too slow, output is materially diminished and overall process efficiency impaired. Likewise, if the separation is not clean, the resultant alumina is somewhat crude and contains sufficiently high levels of iron to make it undesirable for a number of end uses.

The iron present in the Bayer process streams may be in the form of various particulate minerals, soluble iron compounds, and/or insoluble colloidal species. A majority of the iron is normally removed by flocculation of the red mud during the Bayer process. However, there remains a problem in that some insoluble iron species i.e. insoluble colloidal iron species are small enough to pass through the filters. Insoluble colloidal iron may be formed during the Bayer process by the precipitation of iron from solution as the digested slurry is cooled. Under the highly alkaline conditions present in the Bayer process stream, i.e. pH greater than 11, usually greater than 12 or even 13, iron may have a solubility of greater than 30 milligrams per liter of Bayer process stream at the high temperatures and pressures existing during digestion, but has much lower solubility at the clarification temperature. For instance, it has been reported that the solubility of iron in $NaAlO_2$ solution is about 2 milligram per liter at the clarification temperature, see P. Basu, G. A. Nitowski and P. J. The, "Chemical Interactions of Iron Minerals During Bayer Digest and Clarification," in *Iron Control in Hydrometallurgy*, Eds. J. E. Dutrizac and A. J. Monhemius, Ellis Horwood Limited, 1986, pp. 223–244. When the digested slurry is cooled, the iron often precipitates in the form of fine insoluble particles (<1000 Å diameter) of colloidal iron. Because of their tiny size, these particles settle so slowly that they may pass through the mud settler and also pass through the pores of even a one-micron filter.

The problem of colloidal iron that passes through the filtration stage is serious because the iron remains in the sodium aluminate entering the precipitation step and thus contaminates the alumina recovered as the main product of the Bayer process with unacceptable levels of iron. Existing techniques have not completely and adequately solved the iron removal problem. U.S. Pat. No. 4,767,540 discloses the use of polymers containing hydroxamate groups, which give improved settling of the fine muds, resulting in overflow liquors with improved clarities and reduced iron content. U.S. Pat. Nos. 3,088,798 and 3,088,799 disclose the use of polyamidoxime to remove soluble metal species from solution at low pH. WO 91/18026 discloses the use of acrylamidoxime/acrylhydroxamic acid polymers as flocculating agents in water treatment. U.S. Pat. No. 4,083,925 discloses the separation of ferrous iron from alkali metal aluminate liquor by contacting it with anionic polyacrylamide under special conditions within the mud settler. U.S. Pat. No. 4,717,550 discloses the use of tertiary hydroxyl-containing polyamines to reduce the iron content of Bayer process streams. All patents, patent applications, and articles mentioned in this application are hereby incorporated herein by reference.

However, there is still a need for a process that efficiently and effectively reduces the amount of insoluble or colloidal iron so as to reduce or avoid contamination of the final alumina product with either iron or the agent added to remove the iron.

SUMMARY OF THE INVENTION

The instant invention presents a solution to the aforementioned problem of colloidal iron contamination by providing a process for reducing the level of colloidal iron in a Bayer process stream, comprising (a) providing a Bayer process stream having (i) a pH of 11 or greater, (ii) a sodium aluminate concentration of greater than 100 grams per liter, and (iii) containing colloidal iron; (b) providing an amidoxime polymer; (c) intermixing said Bayer process stream with about 1 milligram to about 500 milligrams of said amidoxime polymer per liter of said Bayer process stream, to form a mixture comprised of sodium aluminate solution and an insoluble polymer-iron complex, and (d) separating said insoluble polymer-iron complex from said sodium aluminate solution to obtain a purified sodium aluminate solution.

DETAILED DESCRIPTION OF THE INVENTION

The instant invention involves a process for reducing the level of colloidal iron in a Bayer process stream. The instant invention may be applied to any Bayer process stream that contains colloidal iron, preferably Bayer process streams having a pH of about 11 or above, more preferably about 12 or above, even more preferably about 12.5 or above, and most preferably about 13 or above. The Bayer process streams generally contain at least about 100 grams per liter of sodium aluminate, preferably at least about 150 grams per liter. In actual practice, the sodium aluminate content is generally reported in terms of the concentrations of the alumina ($Al_2O_3$) and the caustic e.g. sodium hydroxide (NaOH). Thus, the Bayer process streams generally contain at least about 100 grams per liter of $Al_2O_3$ and at least about 100 grams per liter of caustic e.g. NaOH.

The colloidal iron present in the Bayer process streams is that iron which is in excess of the amount of iron which is dissolved. As used herein, the term "colloidal iron" is a general term that is to be read broadly to include all iron species which are insoluble under the particular conditions of temperature, pressure, etc. present in the Bayer process stream under consideration, and which can pass through a three-micron filter. Under a given set of conditions, iron has a known or readily determinable solubility limit in a Bayer process stream. For the purposes of this invention, the level of iron present in the Bayer process stream that is in excess of that solubility limit is considered to be colloidal iron. For instance, if the level of iron in a particular Bayer process stream is 50 milligrams per liter, and the solubility of iron under those conditions is known or determined to be 2 milligrams per liter, then the level of colloidal iron in that Bayer process stream is 48 milligrams per liter. The term "colloidal iron" thus encompasses insoluble species of iron such as insoluble $\alpha$-FeOOH, insoluble $Fe(OH)_3$, insoluble $\alpha$-$Fe_2O_3$, insoluble complexes of iron with humic, oxalic, succinic or malonic acid, insoluble calcium ferrate, insoluble calcium aluminoferrate, etc.

In actual production, various factors may be considered when deciding on the pore size of the filter to be employed in the filtration step. For instance, a filter with a large pore size may be preferred in order to increase throughput, but this desire must often be balanced against the need for a small pore size in order to remove small insoluble particles. The processes of the instant invention function effectively when the particle size of the colloidal iron is large, but they are of particular value when the particle size is such that all or part of the colloidal iron passes through the filter. In preferred embodiments, the Bayer process stream is comprised of colloidal iron that has a particle size that is smaller than the pore size of the filter employed in that stream, preferably a particle size of about two microns or less, more preferably about one micron or less, even more preferably about 0.5 micron or less, most preferably about 0.25 micron or less.

The instant inventor has discovered that amidoxime polymers are useful and effective for removing colloidal iron from Bayer process streams when used in accordance with the teachings set forth herein. The amidoxime polymer of the instant invention may be any polymer that contains pendant amidoxime groups. In a preferred embodiment, the amidoxime polymer is a particulate polymer wherein less than 25% of the particulate polymer, by weight based on total weight of said particulate polymer, is soluble in aqueous 0.1N NaOH solution at 25° C. The relative insolubility of the amidoxime polymer in this preferred embodiment is a feature of the instant invention, and helps to solve the problem of iron removal by being easy to remove from the Bayer process stream by filtration, so as not to contaminate the alumina product.

In preferred embodiments of the instant invention, the amidoxime polymer is prepared by dispersing a finely divided precursor polymer in water, adding hydroxylamine, and stirring and heating the resulting mixture at a pH of from about 3 to about 10, preferably bout 5 to about 10, at a temperature of about 50° to about 90° C., preferably about 70° to bout 90° C., for about 15 minutes to about 5 hours, preferably about 1–3 hours. If the resulting amidoxime polymer is soluble, it may be provided to the user in the form of a polymer solution, or may be dried to obtain a particulate polymer in a dry form.

In a preferred embodiment, the amidoxime polymer is a particulate polymer. preferably, the particulate polymer is formed during the reaction of the precursor polymer and hydroxylamine by virtue of being largely insoluble in the hydroxylamine reaction medium. Thus, the particulate polymer may be provided in the processes of the instant invention in the form of the dispersion resulting from the aforementioned preparation process. More preferably, the particulate polymer may be recovered from the dispersion by known means e.g. filtering, then dried and provided to the site of the Bayer process stream in a dry form e.g. dry particulate powder or granules. The particulate polymer may also be provided in the form of an aqueous admixture e.g. an aqueous admixture formed by mixing a dispersion or a dry particulate with an aqueous liquid such as water, Bayer process liquor, etc.

It is preferred that the particulate polymer be relatively insoluble in the Bayer process stream so that the polymer-iron complex, resulting from the contact of the particulate polymer with the Bayer process stream, is also insoluble and therefore relatively easy to remove from the Bayer process stream by a solids-liquid separation process e.g. settling, centrifugation, filtration, etc., preferably filtration. The solubility of the particulate polymer may be characterized by determining the percentage of the polymer that is soluble in aqueous 0.1N NaOH solution at 25° C., as described in the working examples below. Preferably, less than about 25% of the particulate polymer, more preferably about 20% or less, even more preferably about 15% or less, most preferably 10% or less, by weight based on total weight of particulate polymer, is soluble in aqueous 0.1N NaOH solution at 25° C.

The average particle size of the particulate polymer may vary over a broad range from about 0.5 micron to about 5000 microns, preferably about 1 micron to about 1200 microns. The selection of particle size involves balancing the desirability for fast removal of iron, achieved when the surface area of the particulate polymer is maximized by having small particle sizes, against the desirability for easier handling properties e.g. non-dusting, faster filtration, etc. that is achieved at larger particle sizes. Thus, the preferred particle size depends on the requirements of the particular application. For instance, if the particulate polymer is in a dry form and it is necessary for handling purposes for the product to be non-dusting, then the average particle size of the particulate polymer is preferably greater than about 300 microns, preferably about 500 microns or greater. On the other hand, if dusting properties are less important, then for most efficient iron removal a smaller average particle size is desirable e.g. about 300 microns or less, most preferably about 100 microns or less. Although a particle size below 0.1 micron could in theory provide very efficient iron removal, in practice the insoluble polymer-iron complex must be large enough to efficiently separate. For instance, if the insoluble polymer-iron complex is to be separated by filtration, it must not be smaller than the pore size of the filter. It is generally undesirable for the particulate polymer or the polymer-iron complex to pass through the separation step because either may contaminate the final alumina product. Practically, this means that the particulate polymer is preferably largely insoluble in the Bayer process stream. The particulate polymer preferably has an average particle size of about 1 micron or greater, preferably about 10 microns or greater, more preferably about 50 microns or greater. Particles sizes may be selected by selection of the appropriate size for the precursor polymer, or the size of an existing particulate polymer may be varied by known mechanical techniques e.g. sieving, grinding, fragmentation, agglomeration, etc.

The precursor polymer from which the amidoxime polymer of the instant invention is formed may be any polymer that contains nitrile groups, preferably a polymer that contains recurring acrylonitrile units, most preferably a vinyl-addition homopolymer or copolymer of acrylonitrile. Copolymers of acrylonitrile may be vinyl-addition copolymers with cationic, anionic or nonionic comonomers. Nonionic comonomers may include water-soluble monomers, preferably acrylamide or methacrylamide, or monomers having lesser water-solubility such as dialkyl(alk)acrylamides, t-butylacrylamide, styrene, alkyl(alk)acrylates, etc. Anionic comonomers may include such monomers as methacrylic acid, acrylic acid, 2-acrylamido-2-methylpropane sulfonic acid, styrenesulfonic acid, salts of the foregoing, etc, preferably acrylic acid and salts thereof. Cationic comonomers may include such monomers as diallyldialkylammonium halides, e.g. diallyldimethylammonium chloride, or the quaternary or acid salts of dialkylaminoalkyl(alk)acrylates or dialkylaminoalkyl(alk)acrylamides, e.g. methyl chloride or dimethyl sulfate quaternary salt of dimethylaminoethyl(meth)acrylamide, dimethylaminoethyl(meth)acrylate, diethylaminoethyl(meth)acrylate, etc. The nitrile groups on the precursor polymer may also be the result of graft polymerization, and in a preferred embodiment the precursor polymer is a graft copolymer of acrylonitrile with a polysaccharide and the resulting polymer is an amidoxime-functionalized polysaccharide. The precursor polymer may be soluble in the hydroxylamine-containing reaction medium, but preferably the precursor polymer is insoluble but swollen, most preferably water-swellable. It is believed that the pendant amidoxime groups on the amidoxime polymer result from a reaction between hydroxylamine and the nitrile groups on the precursor polymer. The amount of hydroxylamine employed is generally that which results in a ratio of hydroxylamine to acrylonitrile recurring units in the range of about 1:5 to 2:1, preferably about 5:10 to 11:10. The form of hydroxylamine employed is preferably an acid salt of hydroxylamine, most preferably hydroxylamine sulfate or hydroxylamine hydrochloride.

The amidoxime polymers of the instant invention are generally comprised of pendant amidoxime groups and are preferably formed by reacting a precursor polymer with hydroxylamine as discussed above. Thus, the amidoxime polymers may generally contain the same recurring units as the precursor polymer, with the understanding that reaction with hydroxylamine may convert all or part of the nitrile groups to amidoxime groups. Preferably, only a part of the nitrile groups are converted, so that the amidoxime polymer preferably contains greater than 5 mole % of recurring acrylonitrile groups, most preferably about 10 mole % or more. Higher proportions of acrylonitrile recurring units generally reduce water-solubility and/or water-swellability, so that the water-solubility and water-swellability of the amidoxime polymers can be controlled to an extent by controlling the proportion of acrylonitrile recurring units in the particulate polymer. Solubility may also be controlled by incorporating a crosslinking agent in an amount of from about 20–5000 molar parts per million, and/or utilizing chain transfer agent during the polymerization of the precursor polymer. The amidoxime polymers of the instant invention generally have a weight average molecular weight of about 10,000 or greater, preferably about 50,000 or greater, even more preferably about 100,000 or greater. Molecular weights may be determined in the usual fashion by known techniques e.g. light scattering or suitably calibrated size exclusion chromatography.

For vinyl-addition amidoxime polymers in which the pendant amidoxime groups are recurring amidoxime units resulting from the reaction of hydroxylamine with acrylonitrile recurring units, the level of amidoxime recurring units in the polymer is generally about 5% or greater, preferably about 10% or greater, most preferably about 20% or greater, by mole based on total moles of recurring units in the amidoxime polymer. It is preferred that the amidoxime polymer contain greater than 5 mole % of recurring acrylonitrile groups to reduce solubility, so the level of amidoxime recurring units in the amidoxime polymer is preferably less than about 95%, more preferably about 90% or less, same basis. The amount of recurring units may be determined in the usual manner by nuclear magnetic resonance (NMR) spectroscopy or infrared (IR) spectroscopy, preferably by NMR. Preferably the amidoxime polymer is lightly colored, e.g. white, off-white, yellowish, beige, etc, to facilitate observation of the resulting polymer-iron complex, which is generally dark-colored e.g. dark red or black.

The amidoxime polymers of the instant invention are generally employed by intermixing them with a Bayer process stream that contains colloidal iron and sodium aluminate at a pH or 11 or greater, allowing the amidoxime polymer to interact with the iron to form a mixture comprised of sodium aluminate solution and an insoluble polymer-iron complex, and separating the insoluble polymer-iron complex from the sodium aluminate solution to obtain a purified sodium aluminate solution. As used herein, the term "insoluble polymer-iron complex" is a general term that is to be read broadly to include all insoluble species which contain both polymer and iron, irrespective of whether the iron is chemically bound to the polymer or physically trapped within the polymer. The formation of the generally dark-colored polymer-iron complex may ordinarily be detected by visual observation, particularly where the polymer is light-colored. The intermixing time may be lengthy, e.g. an hour or more, but it is generally preferred that the intermixing time be as short as practical in order to maintain efficient production. Preferably, the amidoxime polymer and Bayer process stream are intermixed for about 1 to about 10 minutes. Preferably, the intermixing involves agitation or stirring, although it is often the case that the existing flow agitation in the Bayer process stream is effective to bring about sufficient intermixing. The amount of amidoxime polymer intermixed with the Bayer process stream may depend on various production factors such as the amount of colloidal iron present, the particle size of the particulate polymer, and the intermixing time, but is generally greater than about one milligram per liter of Bayer process stream, preferably greater than about 10 milligrams per liter of Bayer process stream. Although iron removal is generally facilitated by using greater amounts of amidoxime polymer, it is generally undesirable to use wasteful or excessive amounts. Generally, the amount of amidoxime polymer is less than about 800 milligrams per liter of Bayer process stream, preferably less than about 500 milligrams per liter of Bayer process stream. The addition point of the amidoxime polymer to the Bayer process stream may be at any point in the Bayer process where removal of colloidal iron is desired, preferably to the settler feed or blow-off discharge, most preferably to the settler overflow before filtration. If the amidoxime polymer is soluble, it may be added to the Bayer process stream in the form of a solution, preferably a dilute solution. If the amidoxime polymer is largely insoluble, it may be added as a particulate in the form of a dispersion, an aqueous admixture, or preferably in a dry form.

The separation of the insoluble polymer-iron complex from the sodium aluminate solution may be by any solids-liquid separation method known in the art, preferably by filtration, more preferably by filtration in combination with a filtration aid, most preferably by filtration in combination with tricalcium aluminate. The separation step may be a separate step, or the amidoxime polymer may preferably be added to the Bayer process stream after settling but before filtration, so that the normal filtration step in the Bayer process may be used to bring about the separation. If a filter aid is employed, it is preferably intermixed with the polymer and the Bayer process stream prior to the separation step e.g. before filtration. Most preferably, the amidoxime polymer, tricalcium aluminate, and Bayer process stream are intermixed, in any order, before filtration. The effectiveness of iron removal may be determined by measuring the level of iron in the Bayer process stream before intermixing with the amidoxime polymer, then measuring the level in the purified sodium aluminate solution after the amidoxime polymer has been added and the insoluble polymer-iron complex has been separated from the sodium aluminate solution. Literature sources report that the solubility of iron under Bayer process clarification conditions e.g. at 70–100° C. is about 2 milligrams per liter of Bayer process stream. Therefore, the level of colloidal iron can often be determined by assuming that any iron in excess of 2 milligrams per liter is colloidal iron, under the temperature and caustic conditions of clarification. The concentration of colloidal iron in the purified sodium aluminate solution, divided by the concentration of colloidal iron in the Bayer process stream before intermixing with the particulate polymer, is generally about 0.9 or less, preferably about 0.5 or less, most preferably about 0.1 or less. The concentration of iron may be determined in the usual way e.g. by elemental or calorimetric analysis.

Contamination of the final alumina product with polymer is generally undesirable. Therefore, the purified sodium aluminate solution generally contains less than about 5 milligrams per liter of polymer, preferably less than about 1 milligram per liter. In this context, "polymer" refers to any of the polymers which may be intermixed with the Bayer process stream for the purpose of iron removal as taught herein, including any of the amidoxime polymer that passes through the separation step, as well as residual precursor polymer and any soluble components of the particulate polymer that are intermixed with the Bayer process stream along with the particulate polymer.

It has also been found that the amidoxime polymers of the instant invention work equally well on Bayer process streams that have been reconstituted under laboratory conditions. Since plant production is often variable, those skilled in the art frequently conduct experiments on Bayer process streams that have been prepared in the laboratory by intermixing controlled amounts of the various components. For instance, a Bayer process stream suitable for laboratory work may be prepared by obtaining spent liquor from a Bayer plant and adding alumina hydrate, ferric oxide and/or ferric sulfate (which immediately precipitates ferric hydroxide) in known amounts. Thus, the term "Bayer process stream" as used herein includes mixtures of spent liquor, alumina hydrate and ferric oxide and/or ferric hydroxide prepared in the laboratory.

The following Examples are provided for demonstrative purposes and do not limit the scope of the instant invention in any way.

EXAMPLE A

A Bayer process stream was prepared in the laboratory as follows: Spent liquor (from a Bayer process plant), alumina hydrate, ferric oxide and ferric sulfate were mixed together under pressure at about 160° C. to dissolve the alumina hydrate and part of the ferric oxide/hydroxide, then cooled to about 95–105° C. to precipitate part of the iron as colloidal iron. This Bayer process stream was then filtered through a 0.45 micron filter to remove the undissolved, non-colloidal iron. This filtered Bayer process stream contained about 7.3 milligrams per liter of iron (of which about 2 milligrams per liter was dissolved and about 5.3 milligrams per liter was colloidal iron), about 120 grams per liter of $Al_2O_3$, and about 160 grams per liter of NaOH.

EXAMPLE 1

A polyacrylonitrile (PAN) slurry was prepared by mixing about 15 parts of PAN powder having a weight average molecular weight of about 220,000 with about 85 parts of water. A separate hydroxylamine solution was prepared by first mixing together about 23.20 parts hydroxylamine sulfate ($NH_2OH$ equivalent to 100% of nitrile groups), about 2.22 parts sodium thiosulfate, and about 35 parts water, and then slowly adding about 11.31 parts of 50% NaOH (equivalent to 50% of the hydroxylamine sulfate). The hydroxylamine solution was then carefully added to the PAN slurry with stirring at a temperature of about 65° C. The temperature was then raised to about 80° C. and held for about 3 hours. The resulting slurry was then filtered to separate the yellowish particulate polymer. The particulate polymer was washed with water and dried at 1050C to obtain about 20.87 parts of particulate polymer (particulate polymer 1).

EXAMPLE 2

A portion of particulate polymer 1 was stirred in 0.1N NaOH for 2 hours at room temperature. After filtration, washing, and drying, 96.6% of the original weight of product was recovered (3.4% was soluble in 0.1N NaOH). A replicate experiment was performed, and in this case 96.5% of the original weight of product was recovered (3.5% was soluble in 0.1N NaOH).

EXAMPLE 3

A polyacrylonitrile copolymer slurry was prepared by mixing about 10 parts of poly(acrylonitrile/methylacrylate) (94/6) powder having a weight average molecular weight of about 100,000 with about 60 parts of water. A separate hydroxylamine solution was prepared by first mixing together about 15.47 parts hydroxylamine sulfate ($NH_2OH$ equivalent to 100% of nitrile groups), about 1.48 parts sodium thiosulfate, and about 60 parts water, and then slowly adding about 7.54 parts of 50% NaOH (equivalent to 50% of the hydroxylamine sulfate). The hydroxylamine solution was heated to about 80° C., then carefully added to the polyacrylonitrile copolymer slurry with stirring and held at about 80° C. for about 3 hours. The resulting slurry was then filtered to separate the yellowish particulate polymer. The particulate polymer was washed with water and dried at 105° C. to obtain about 14.14 parts of particulate polymer (particulate polymer 2). Analysis of particulate polymer 2 (NMR) gives amidoxime content of 63 mole % and nitrile content of 17 mole %.

EXAMPLE 4

A portion of particulate polymer 2 was stirred in 0.1N NaOH for 2 hours at room temperature. After filtration, washing, and drying, 95.2% of the original weight of product was recovered (4.8% was soluble in 0.1 N NaOH).

EXAMPLES 5–8

Particulate polymer 2 was tested for its ability to remove colloidal iron by adding the amounts of particulate polymer 2 shown in Table 1 to a Bayer process stream prepared as in Example A at about 95° C. (dosage in units of mg/l, i.e. milligrams of particulate polymer 2 per liter of Bayer process stream), mixing for about one minute, then filtering to remove the dark-colored polymer-iron complex, and analyzing the filtrate for iron (units of mg/l, i.e. milligrams of iron per liter of purified sodium aluminate solution). Since more than 2 milligrams per liter (mg/l) of iron was removed by the treatment in Examples 7 and 8 (compare to comparative Example 5C), at least part of the iron removed must have been colloidal iron. Likewise, colloidal iron was almost certainly removed in Example 6, although the amount of reduction was less than 2 mg/l and the iron assay method employed in this Example did not distinguish between colloidal and non-colloidal iron.

TABLE 1

| Ex. No. | Dose of particulate polymer 2, mg/l | Iron in purified sodium aluminate solution after treatment, mg/l |
| --- | --- | --- |
| 5C | 0 | 7.3 |
| 6 | 15 | 6.0 |
| 7 | 30 | 5.2 |
| 8 | 60 | 3.4 |

EXAMPLE 9

A polyacrylonitrile (PAN) slurry was prepared by mixing about 14.74 parts of PAN powder having a weight average molecular weight of about 220,000 with about 85.26 parts of water. The slurry was mixed with about 22.80 parts hydroxylamine sulfate ($NH_2OH$ equivalent to 100% of nitrile groups), about 2.18 parts sodium thiosulfate, about 93.1 parts water, and about 11.1 parts of 50% NaOH (equivalent to 50% of the hydroxylamine sulfate). The mixture was then heated with stirring at a temperature of about 70–80° C. for about 2 hours. The pH of the slurry was about 5.2. The resulting slurry was then filtered to separate the yellowish particulate polymer. The particulate polymer was washed with water and dried at 60° C. to obtain particulate polymer 3. Analysis of particulate polymer 3 (IR) gives amidoxime content of 60 mole % and nitrile content of 34 mole %.

EXAMPLES 10–12

Particulate polymer 3 was tested for its ability to remove colloidal iron in the same manner as described in Examples 5–8. The results are shown in Table 2. Since more than 2 milligrams per liter (mg/l) of iron was removed by the treatment in Examples 11–12 (compare to comparative Example 10C), at least part of the iron removed must have been colloidal iron.

TABLE 2

| Ex. No. | Dose of particulate polymer 3, mg/l | Iron in purified sodium aluminate solution after treatment, mg/l |
| --- | --- | --- |
| 10C | 0 | 6.4 |
| 11 | 50 | 4.3 |
| 12 | 100 | 2.7 |

EXAMPLE 13

About 3.0 parts of PAN powder having a weight average molecular weight of about 150,000 was mixed with about 4.87 parts hydroxylamine sulfate ($NH_2OH$ equivalent to 105% of nitrile groups), about 92 parts water, and about 4.75 parts of 50% NaOH (equivalent to 100% of the hydroxylamine sulfate). The resulting mixture was then heated to about 80–90° C. for about 1 hour. The pH of the slurry was about 9.0. The resulting dispersion contained about 5.0 weight % of particulate polymer 4.

EXAMPLES 14–16

Particulate polymer 4 (dispersion) was tested for its ability to remove colloidal iron in the same manner as described in Examples 5–8. The results are shown in Table 3. Since more than 2 milligrams per liter (mg/l) of iron was removed by the treatment in Examples 15–16 (compare to comparative Example 14C), at least part of the iron removed must have been colloidal iron.

TABLE 3

| Ex. No. | Dose of particulate polymer 4, mg/l | Iron in purified sodium aluminate solution after treatment, mg/l |
| --- | --- | --- |
| 14C | 0 | 7.7 |
| 15 | 50 | 5.0 |
| 16 | 100 | 3.1 |

EXAMPLES 17–20

Four amidoxime polymers were prepared by the procedures disclosed in Examples 1 and 2 of WO 91/18026, according to the formulation parameters referenced in Table 4 below.

TABLE 4

| Ex. No. | Example No. in WO 91/18026 |
| --- | --- |
| 17 | 1 |
| 18 | 2 (6th entry in Table 1 at page 8 of WO 91/18026) |
| 19 | 2 (8th entry in Table 1 at page 8 of WO 91/18026) |
| 20 | 2 (11th entry in Table 1 at page 8 of WO 91/18026) |

EXAMPLES 21–24

A portion of each of the four amidoxime polymers shown in Table 4 was stirred in 0.1N NaOH for 2 hours at room temperature, as in Examples 2 and 4 above, to determine the amount of polymer that was soluble in aqueous 0.1N NaOH solution at 25° C. A replicate experiment was performed on the amidoxime polymer of Example 18. The results are shown in Table 5 below. These results demonstrate a clear difference in solubility between the amidoxime polymers of WO 91/18026 and the preferred particulate polymers of the instant invention.

TABLE 5

| Ex. No. | Source of particulate polymer | Weight % of particulate polymer soluble in aqueous 0.1N NaOH solution at 25° C. |
|---|---|---|
| 2 | Example 1 | 3.4, 3.5* |
| 4 | Example 3 | 4.8 |
| 21 | Example 17 | 30.5 |
| 22 | Example 18 | 30.6, 31.1* |
| 23 | Example 19 | 51.3 |
| 24 | Example 20 | 78.1 |

*Replicate experiment

We claim:

1. A process for reducing the level of colloidal iron in a Bayer process stream, comprising (a) providing a Bayer process stream having (i) a pH of 11 or greater, (ii) a sodium aluminate concentration of greater than 100 grams per liter, and (iii) containing colloidal iron; (b) providing an amidoxime polymer; (c) intermixing said Bayer process stream with about 1 milligram to about 500 milligrams of said amidoxime polymer per liter of said Bayer process stream, to form a mixture comprised of sodium aluminate solution and an insoluble polymer-iron complex, and (d) separating said insoluble polymer-iron complex from said sodium aluminate solution to obtain a purified sodium aluminate solution.

2. A process as claimed in claim 1, wherein said Bayer process stream contains at least about 2 mg of said colloidal iron per liter of said Bayer process stream.

3. A process as claimed in claim 1, wherein the concentration of colloidal iron in said purified sodium aluminate solution obtained in step (d), divided by the concentration of colloidal iron in said Bayer process stream in step (a), is about 0.9 or less.

4. A process as claimed in claim 1, wherein said separating is carried out by filtering said mixture.

5. A process as claimed in claim 1 which further comprises intermixing tricalcium aluminate with said Bayer process stream prior to said separating.

6. A process as claimed in claim 1, wherein said amidoxime polymer is a vinyl-addition polymer comprised of about 10 mole % or greater of recurring acrylamidoxime groups, based on total moles of recurring units.

7. A process as claimed in claim 6, wherein said amidoxime polymer is a vinyl-addition polymer comprised of greater than about 5 mole % of recurring acrylonitrile units, based on total moles of recurring units.

8. A process as claimed in claim 1 wherein said amidoxime polymer is an amidoxime-functionalized polysaccharide.

9. A process as claimed in claim 1, wherein said amidoxime polymer is a particulate polymer and wherein less than 25% of said particulate polymer, by weight based on total weight of said particulate polymer, is soluble in aqueous 0.1 N NaOH solution at 25° C.

10. A process as claimed in claim 1, wherein said amidoxime polymer is a particulate polymer and wherein less than about 10% of said particulate polymer, by weight based on total weight, is soluble in aqueous 0.1 N NaOH solution at 25° C.

11. A process as claimed in claim 9, wherein said particulate polymer has an average particle size in the range of about one micron to about 1200 microns.

12. A process as claimed in claim 9, wherein said particulate polymer is provided in the form of a dispersion.

13. A process as claimed in claim 9, wherein said particulate polymer is provided in a dry form.

14. A process as claimed in claim 9, wherein said particulate polymer is provided in the form of an aqueous admixture.

15. A process as claimed in claim 1, wherein said Bayer process stream is settler feed.

16. A process as claimed in claim 1, wherein said Bayer process stream is settler overflow.

17. A process as claimed in claim 1, wherein said Bayer process stream is blow-off discharge.

18. A process for reducing the level of colloidal iron in a Bayer process stream, comprising (a) providing a Bayer process stream having (i) a pH of about 13 or greater, (ii) a sodium aluminate concentration of greater than 100 grams per liter, and (iii) containing colloidal iron; (b) providing an amidoxime polymer; (c) intermixing said Bayer process stream with about 1 milligram to about 500 milligrams of said amidoxime polymer per liter of said Bayer process stream, to form a mixture comprised of sodium aluminate solution and an insoluble polymer-iron complex, and (d) filtering said insoluble polymer-iron complex from said sodium aluminate solution to obtain a purified sodium aluminate solution, wherein said amidoxime polymer is a particulate vinyl-addition polymer comprised of greater than about 5 mole % of recurring acrylonitrile units, based on total moles of recurring units, and wherein less than 25% of said particulate vinyl-addition polymer, by weight based on total weight of said particulate polymer, is soluble in aqueous 0.1N NaOH solution at 25° C.

\* \* \* \* \*